US006616243B2

(12) United States Patent
Russell et al.

(10) Patent No.: US 6,616,243 B2
(45) Date of Patent: Sep. 9, 2003

(54) OUTRIGGER FOR STABILIZING A DUMP TRAILER

(75) Inventors: Donald R. Russell, Yakima, WA (US); James P. Kunz, Selah, WA (US)

(73) Assignee: Carrier Transports, Inc., Yakima, WA (US)

(*) Notice: Subject to any disclaimer, the term of this patent is extended or adjusted under 35 U.S.C. 154(b) by 0 days.

(21) Appl. No.: 10/152,999

(22) Filed: May 22, 2002

(65) Prior Publication Data

US 2003/0067206 A1 Apr. 10, 2003

Related U.S. Application Data

(63) Continuation of application No. 09/602,207, filed on Jun. 23, 2000, now abandoned.

(51) Int. Cl.⁷ .................................................. B60P 1/00
(52) U.S. Cl. ............................. 298/17 SG; 280/764.1
(58) Field of Search ........................... 298/17 S, 17 SG; 280/763.1, 764.1; 254/423

(56) References Cited

U.S. PATENT DOCUMENTS

| 2,189,052 | A | * | 2/1940 | Anthony | 298/17 SG |
|---|---|---|---|---|---|
| 2,350,141 | A | * | 5/1944 | Wood | 298/17 SG |
| 3,880,469 | A | * | 4/1975 | Harrom | 298/17 SG |
| 4,236,643 | A | * | 12/1980 | Schmitz | 280/764.1 X |
| 4,286,803 | A | * | 9/1981 | Schulz | 298/17 S X |
| 4,474,526 | A | * | 10/1984 | Gevers | 298/17 SG X |
| 4,624,618 | A | * | 11/1986 | LaBerdia et al. | 298/17 SG X |
| 5,015,008 | A | * | 5/1991 | Schupback | 280/764.1 |
| 5,458,451 | A | * | 10/1995 | Bratlie et al. | 298/17 SG X |

FOREIGN PATENT DOCUMENTS

DE  1017918  * 10/1957  .................. 254/423

* cited by examiner

Primary Examiner—Stephen T. Gordon
(74) Attorney, Agent, or Firm—Perkins Coie LLP (57) ABSTRACT

An outrigger assembly having a mounting portion mountable directly to a dump trailer suspension system. In one embodiment, the mounting portion is mounted directly to leaf springs of a suspension system. Two stabilizing arms are pivotably attached to the mounting portion. A driving mechanism is connected to the stabilizing arm and configured to move the stabilizing arms between an inward, stowed position, and an extended, stabilized position. The stabilizing arms being shaped and sized to engage the ground outboard of the dump trailer wheel base to increase the effective width of the dump trailer's support base, thereby stabilizing the dump trailer from tipping.

12 Claims, 6 Drawing Sheets

OUTRIGGER FOR STABILIZING A DUMP TRAILER

CROSS REFERENCE TO RELATED APPLICATIONS

This application is a continuation of U.S. patent application Ser. No. 09/602,207, titled AN OUTRIGGER FOR STABILIZING A DUMP TRAILER, filed Jun. 23, 2000 and now abandoned.

TECHNICAL FIELD

The present invention is directed to outrigger assemblies, and more particularly to outrigger assemblies for use with dump trailers.

BACKGROUND OF THE INVENTION

Dump trailers are used extensively to haul and dump a wide variety of loads, such as dirt, fill, asphalt, rocks, and the like. One essential function of a dump trailer is the ability to lift the front end of the trailer bed upwardly to tip the bed to dump its contents out through the bed's open rear gate. When the full trailer bed is in the lowered position, the dump trailer is very stable and difficult to tip. As the full trailer bed is tilted upwardly, the dump trailer's center of gravity moves upwardly, so the dump trailer is more susceptible to tipping. The dump trailer is also more susceptible to tipping when the bed is raised and the center of gravity shifts laterally relative to dump trailer's longitudinal axis. Such lateral movement can occur if the dump trailer is parked on an inclined or unstable surface, or if the load within the bed shifts as the contents are being dumped from the trailer bed. If the center of gravity of the trailer bed moves outside the dump-trailer's wheel-base, the dump trailer could tip.

The prior art has attempted to overcome the dump trailer's susceptibility to tipping when the trailer bed is raised. One such attempt includes providing level indicators on the dump trailer to determine whether the dump trailer is level before lifting the bed. In some situations, the process of adjusting the dump trailer to a level orientation is not feasible or practical, such as on undulating terrain at a construction site. In such a situation, the level indicators can inform the user by indicating how far away the trailer is from being level.

SUMMARY OF THE INVENTION

The present invention overcomes limitations of the prior art and provides additional benefits. One embodiment of the invention provides an outrigger assembly having a mounting portion mountable to a dump trailer's suspension system, and two stabilizing arms pivotably attached to the mounting portion. A driving mechanism is connected to the stabilizing arms and is configured to move the stabilizing arms between an inward, stowed position and an extended, stabilizing position. The stabilizing arms are shaped and sized to engage the ground outboard of the dump trailer's wheel base to increase the effective width of the dump trailer's support base, thereby stabilizing the dump trailer from tipping.

In one embodiment of the invention, the mounting portion is releasably attached directly to a leaf spring suspension system of the dump trailer. The stabilizing arms are pivotally attached to the mounting portion adjacent to the leaf springs. The driving mechanism for each outrigger arm is a hydraulic actuator coupled to the dump trailer's hydraulic system. The hydraulic actuators are adapted to retract the stabilizing arms into a near vertical position adjacent to the dump trailer's bed with the stabilizing arms inboard of the rear wheels, so the stabilizing arms do not inhibit normal operation of the dump trailer.

DETAILED DESCRIPTION

In the following description, certain specific details are set forth in order to provide a thorough understanding of various embodiments of the invention. The present disclosure describes outrigger assemblies mountable on suspension systems of dump trailers either during the initial manufacturing of the trailers, or while retrofitting of the dump trailers. Many specific details of certain embodiments of the invention are set forth in the following description and in FIGS. 1–8 to provide a thorough understanding of these embodiments. One skilled in the art will understand that the present invention may have additional embodiments, or that the invention may be practiced without several of the details described below. In other instances, well-known structures associated with dump trailers and suspension systems, such as spring leaf suspension systems, have not been shown or described in detail to avoid unnecessarily obscuring the description of the embodiments of the invention.

Figure 1:
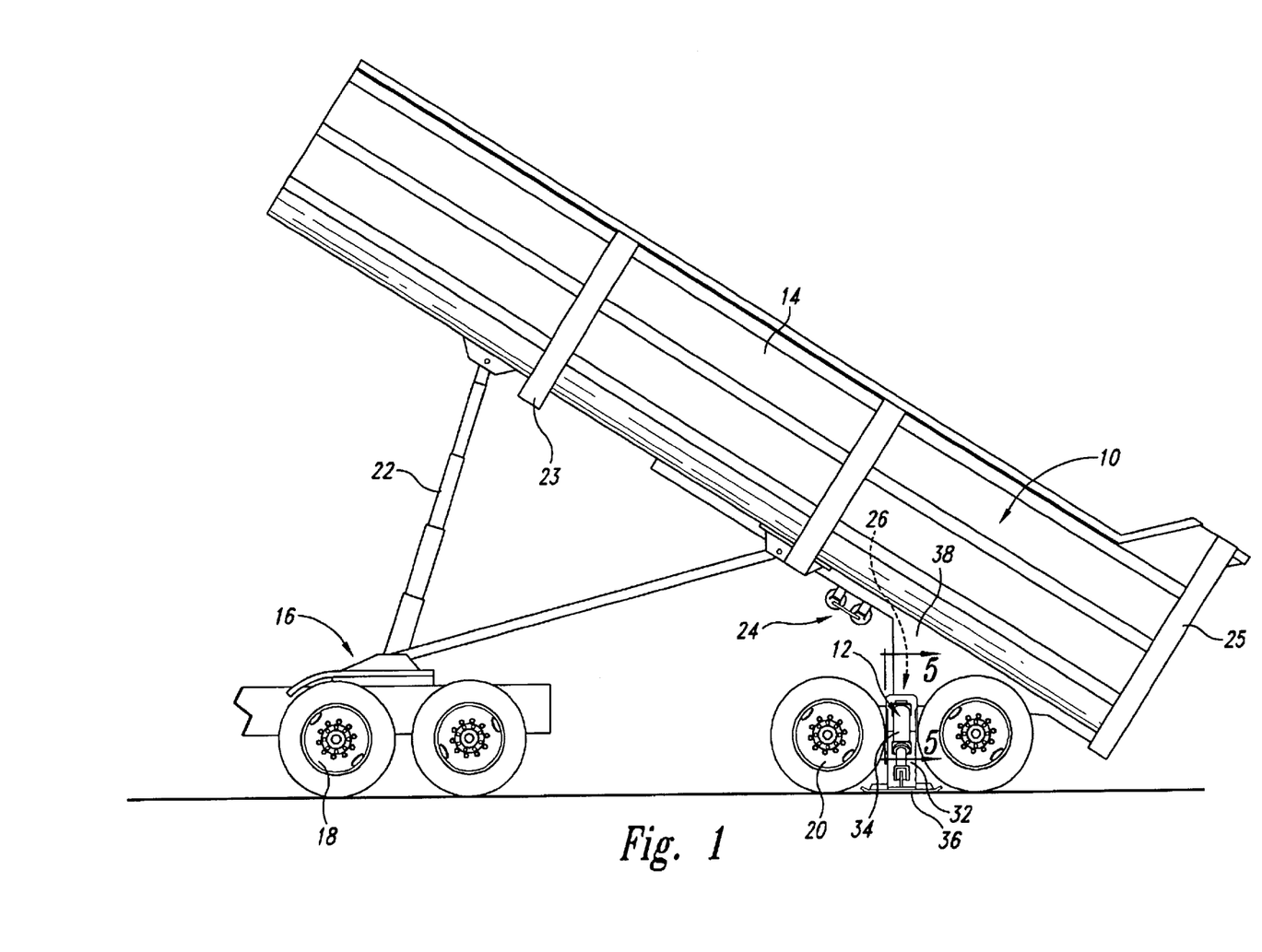
FIG. 1 is a side elevation view of a truck and dump trailer with an outrigger assembly in accordance with one embodiment of the invention, the outrigger assembly is shown mounted to the dump trailer's rear suspension system below a tilted trailer bed.

FIG. 1 is a side elevation view of a dump trailer 10 having an outrigger assembly 12 in accordance with an embodiment of the invention. In one aspect of the embodiment, the dump trailer 10 has a trailer bed 14 mountable to a frame 16. The frame 16 has a forward portion 18 and a rear wheel set 20 that support the trailer bed 14. The trailer bed 14 is pivotally mounted to the rear wheel set 20 and is connected to the forward portion 18 by a hydraulic hoist actuator 22. The hoist actuator 22 is coupled to the dump trailer's hydraulic system 24 and is adapted to raise and lower the trailer bed's front end 23. The trailer bed's rear end 25 pivots about the rear wheel set 20 as the trailer bed 14 moves between raised and lowered positions.

Figure 2:
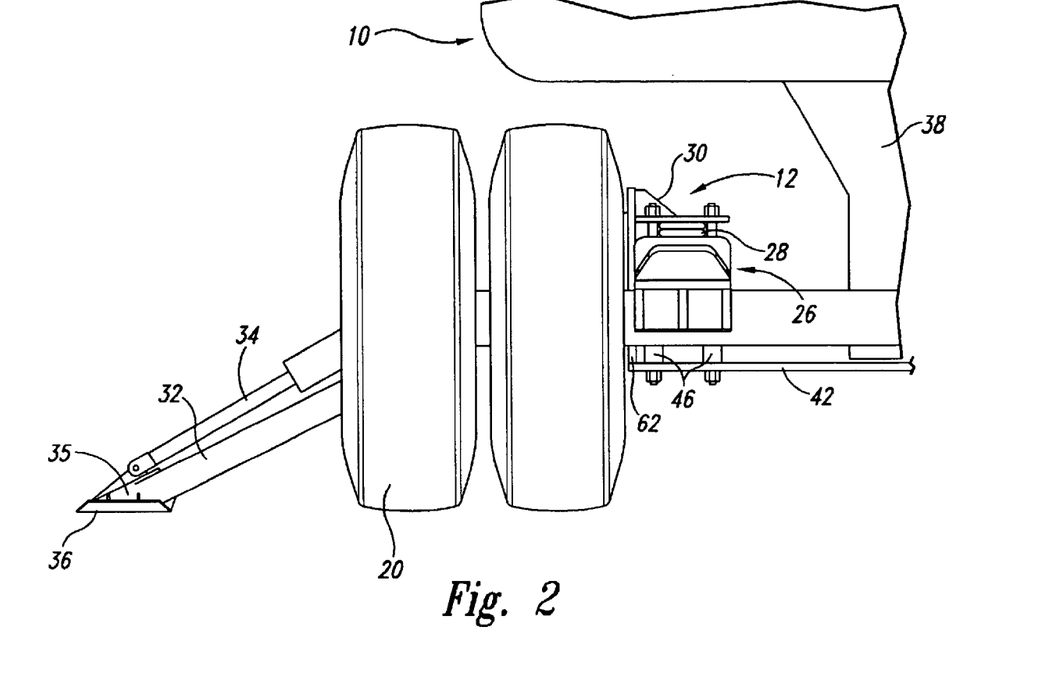
FIG. 2 is an enlarged partial rear elevation view of the dump trailer and an outrigger assembly of FIG. 1, the outrigger assembly being shown with a stabilizing arm in an extended, stabilizing position.
Figure 3:
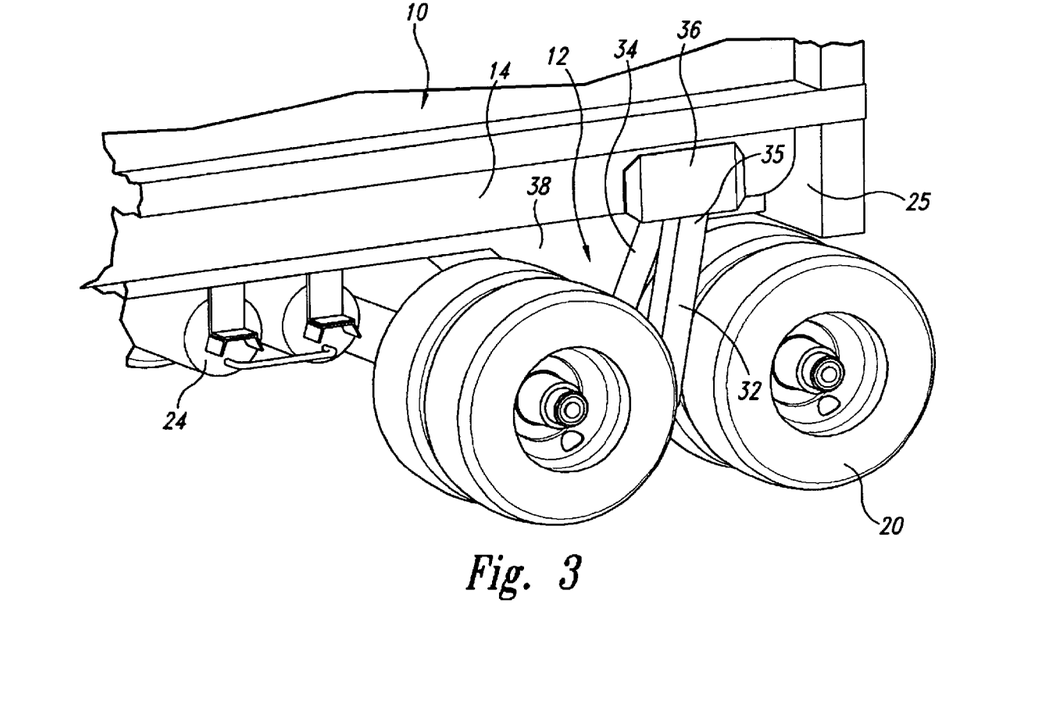
FIG. 3 is an enlarged partial side isometric view of the dump trailer and outrigger assembly of FIG. 1, the stabilizing arms being shown in a raised, stowed position.

FIGS. 2 and 3 illustrate the outrigger assembly 12 attached to a suspension system 26 of the rear wheel set 20. In the illustrated embodiment, the suspension system 26 is a leaf spring suspension system with a stack of leaf springs 28 on each of the left and right sides of the rear wheel set 20. A mounting portion 30 of the outrigger assembly 12 is attached to the left and right leaf spring stacks 28. In one aspect of the invention, the mounting portion 30 is configured to be attached to an existing leaf spring suspension system 26 on a dump trailer, so the dump trailer can be easily and quickly retrofitted with the outrigger assembly 12.

The outrigger assembly 12 includes a pair of stabilizing arms 32 pivotally connected to the mounting portion 30 so the stabilizing arms are positioned on the left and right sides of the dump trailer 10. Each stabilizing arm 32 is connected to a hydraulic arm actuator 34 that pivots the respective stabilizing arm upwardly and downwardly relative to the mounting portion 30 and the suspension system 26. Each arm actuator 34 is pivotally attached at one end to the mounting portion 30 and at the other end to the stabilizing arm's free end 35. Each arm actuator 34 moves its respective stabilizing arm 32 between an extended, stabilizing position (FIG. 2) and a raised, stowed position (FIG. 3).

In the extended, stabilizing position, the stabilizing arm's free end 35 is adjacent to the ground. A support plate 36 is rigidly mounted to the stabilizing arm's free end 35 and is positioned to firmly press against the ground. The support plates 36 engage the ground at positions outward from the rear wheels of the rear wheel set 20, thereby providing a wider support base for the dump trailer's rear end. This wider support base increases the stability of the dump trailer 10, particularly if a load in the trailer bed shifts during a dumping procedure.

In the raised, stowed position, each stabilizing arm 32 extends upwardly from the mounting portion 30 and is positioned so the support plate 36 is generally adjacent to the dump trailer's trailer bed 14. In one embodiment, the stabilizing arms 32 extend substantially vertically from the mounting portion 30 and adjacent to the trailer bed 14. In this raised, stowed position, the stabilizing arms 32 with the support plates 36 are inboard of the rear wheel assemblies of the rear wheel set 20. Accordingly, the stabilizing arms 32 do not increase the width of the dump trailer 10 or interfere with trailer movement when the stabilizing arms are stowed.

Figure 4:
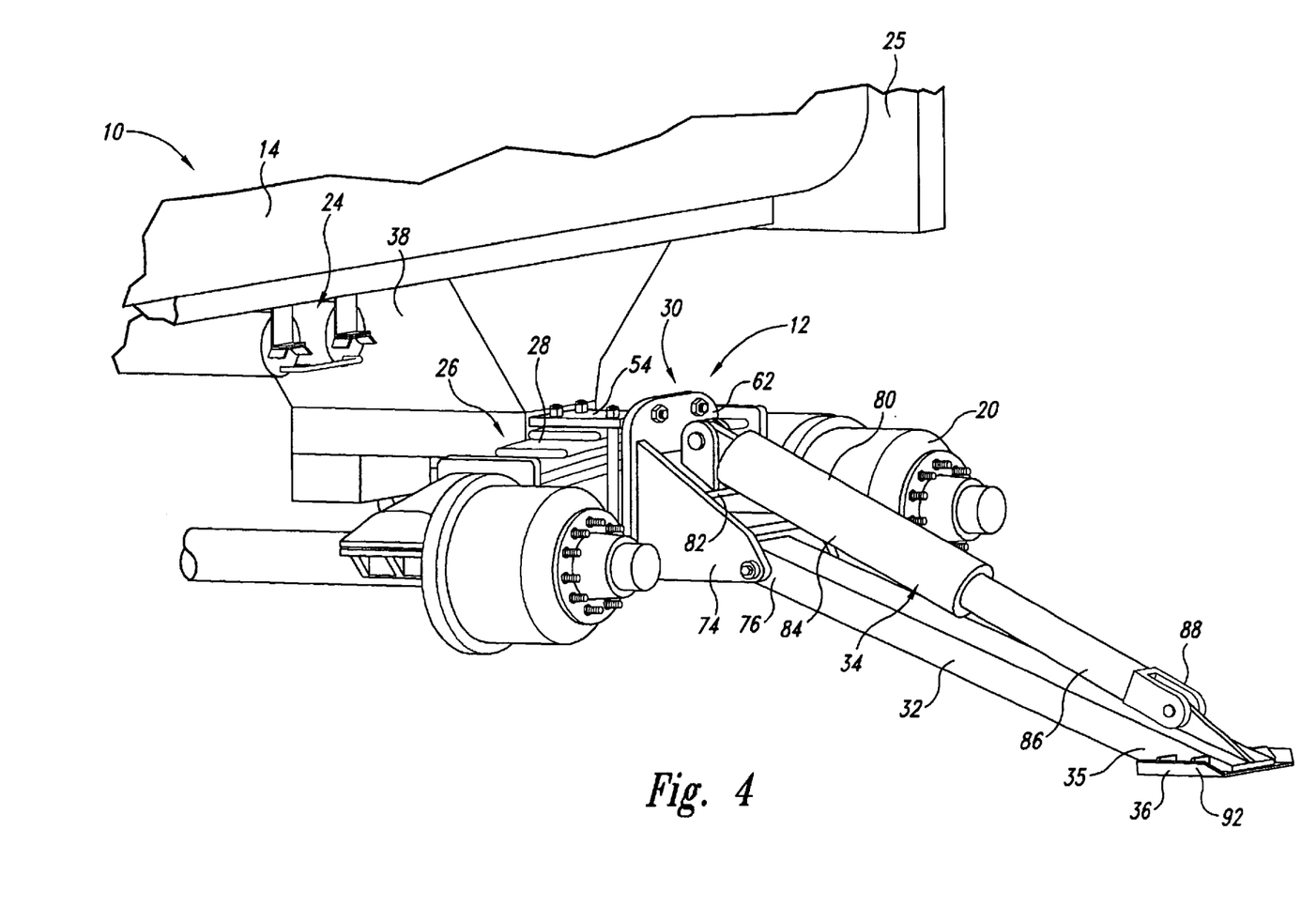
FIG. 4 is an enlarged partial side isometric view of the outrigger assembly of FIG. 1 attached to the dump trailer's leaf spring suspension system, with the rear wheels of the dump trailer being removed for purposes of clarity.

FIG. 4 is a rearwardly facing partial isometric view of the left side of the outrigger assembly 12. The rear wheel set 20 are not shown for purposes of clarity. As discussed in greater detail below, the outrigger assembly 12 is mounted to the rear wheel set's suspension system 26 in alignment with the pivot axis of the trailer bed 14. The outrigger assembly 12 is also attached directly to the leaf springs of the suspension system 26 between the two rear wheel assemblies on the dump trailer's left side. A similar configuration is provided on dump trailer's right side between the two rear wheel assemblies. The mounting portion 30 is attached to a middle portion of the suspension system 26 between the front and back rear wheel assemblies so that the outrigger assembly does not adversely impact the suspension system's performance, such as when the dump trailer is traveling over roads or highways.

As best seen in FIG. 4, the trailer bed 14 has an attachment flange 38 that extends downwardly between the left and right leaf spring stacks 28. The attachment flange 38 connects to a trunnion 40 extending between the leaf spring stacks 28. The trunnion 40 is a center-point trunnion that defines the pivot axis about which the dump trailer's bed 14 rotates as the bed moves between the dumping and lowered positions. The outrigger assembly 12 is positioned so it does not interfere with the tilting motion of the trailer bed 14.

Figure 5:
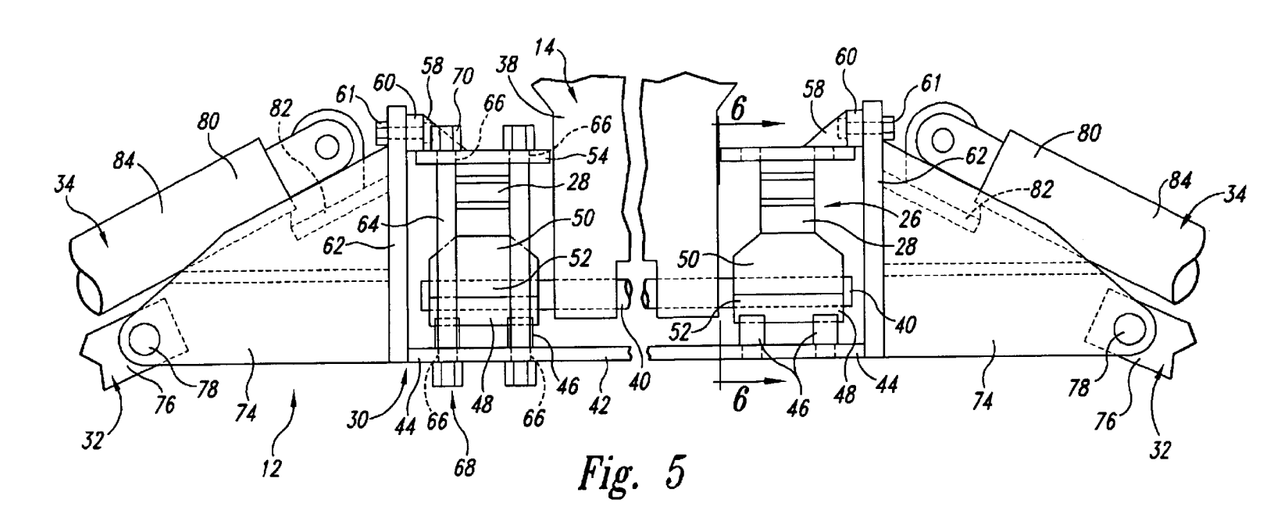
FIG. 5 is a partial cross-sectional view taken substantially along lines 5—5 of FIG. 1, with retaining bolts being shown on the figure's left side and not shown on the figure's right side for purposes of clarity.
Figure 6:
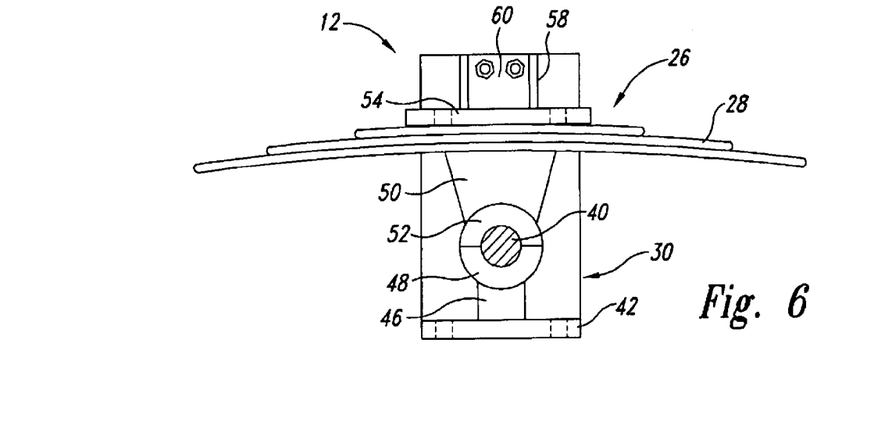
FIG. 6 is a cross-sectional view taken substantially along line 6—6 of FIG. 5.

FIGS. 5 and 6 show partial elevational and cross-sectional views of the outrigger assembly 12 mounted to the suspension system 26. The outrigger assembly 12 has an elongated bottom plate 42 extending under the suspension system 26. The bottom plate 42 has outer end portions 44 that each support a pair of mounting saddles 46 below the left or right spring leaf stack 28. A lower trunnion cap 48 is carried by the mounting saddles, and the lower trunnion cap supports a respective left or right end of the trunnion 40. A spring seat 50 having an integral upper trunnion cap 52 is connected to the lower trunnion cap 48 so the trunnion 40 is pivotally captured between the trunnion caps. Accordingly, each end of the trunnion 40 is securely yet pivotally supported in the suspension system 26 by the upper and lower trunnion caps 52 and 48.

The top of each spring seat 50 supports a stack of leaf springs 28 at the stack's middle portion. Each leaf spring stack 28 is securely sandwiched against its respective spring seat 50 by a top plate 54 of the outrigger assembly's mounting portion 30. The top plate 54 presses against the uppermost leaf spring 28. Accordingly, the outrigger assembly 12 mounts directly to the suspension system and clamps each leaf spring stack 28 together.

Each top plate 54 supports a pair of triangular mounting ears 58 and a small, vertically oriented mounting plate 60 between the mounting ears. The mounting ears 58 and the mounting plate 60 are welded together and are welded to the upper surface of the top plate 54. Each mounting plate 60 of the illustrated embodiment is bolted by a pair of bolts 61 to a top portion of a vertically oriented side plate 62 of the mounting portion 30. Each side plate 62 is located outboard of the respective leaf spring stack 28. The bottom portion of each side plate 62 is welded or otherwise securely fixed to a respective end of the bottom plate 42. Accordingly, the top plates 54, the side plates 62, and the bottom plates are all rigidly interconnected and mount directly to the suspension system's leaf springs 28 at a center portion that does not adversely effect the suspension system's performance.

As illustrated on the left side of FIG. 5, the outrigger assembly 12 includes a plurality of elongated bolts 64 that securely hold the mounting portion 30 to the suspension system 26. The bolts 64 extend through bolt holes 66 in the top and bottom plates 54 and 42 so the bolt's head 68 is adjacent to the bottom plate's lower surface. A nut 70 is screwed on to its respective bolt adjacent to the upper plate's top surface. In the illustrated embodiment, each top plate 54 is held in place on its respective leaf spring stack 28 by four bolts 64.

The outrigger assembly 12 is easily retrofitted on the dump trailer's suspension system 26 by removing the U-bolts and top cap plates from the conventional spring leaf suspension system, and moving the outrigger assembly into place with the bottom plate 26 extending under the left and right leaf spring stacks 28. The top plates 54 are each placed onto the center of the respective leaf spring stack 28. Each top plate 54 is bolted to its respective vertical side plate 62 with the small bolts 61. Accordingly, the mounting portion is clamped directly onto the suspension system 30. The elongated bolts 64 are then placed through the bolt holes 66 in the top and bottom plates 54 and 42, and the bolts are secured in position with the nuts 70. The outrigger assembly 12 is also adapted to be easily removed from a dump trailer when an outrigger configuration is not needed.

Mounting the outrigger assembly 12 directly to the trailer's suspension system allows for a more effective and efficient stabilization of the dump trailer 10, especially when the ground is uneven or when loads change or shift within the trailer bed. The outrigger assembly 12 provides direct support of the dump trailer's frame, so forces exerted on the frame, such as when a load shifts, are transmitted from the frame to the outrigger assembly. The suspension system 26 is, thus, bypassed and the outrigger assembly 12 reacts the forces exerted on the frame when the stabilizing arms are in the extended, stabilizing position.

Referring again to FIGS. 4 and 5, each of the stabilizing arms 32 are pivotally mounted to a pair of large mounting flanges 74 that extend perpendicularly outward from the vertical side plates 62. In the illustrated embodiment, two spaced-apart mounting flanges 74 are welded to each side plate 62 in a position such that the upper end 76 of the respective stabilizing arm 32 is received between the two mounting flanges. The stabilizing arm is pivotally mounted to the mounting flanges by a pivot axle 78 that extends through lower portions of the mounting flanges 74 and through the stabilizing arm's upper end 76. As best seen in FIG. 4, the stabilizing arm 32 of the illustrated embodiment is a tubular member having a square cross-sectional area. The stabilizing arm 32 of other embodiments can have other cross-sectional shapes.

Each stabilizing arm 32 is rigidly connected at its free end 35 to a generally flat support plate 36. The support plate 36 is adapted to engage the ground when the stabilizing arm 32 is in the outward extended position. The support plate 36 of the illustrated embodiment has curved edge portions 92 that help avoid the edge portions from cutting into the ground or other support surface.

Movement of the stabilizing arm 32 and support plate 36 relative to the mounting portion 30 is controlled by the respective arm actuator 34. The arm actuator 34 is pivotally mounted at its upper end 80 to a cross plate 82 welded between the two mounting flanges 74. The arm actuator 34 includes a hydraulic cylinder 84 attached to the cross-plate 82 above the stabilizing arm's pivot axle 78. An actuator shaft 86 extends outwardly from the hydraulic cylinder 84 and pivotally attaches at its distal end 88 to the stabilizing arm's free end 35. While the arm actuators 34 of the illustrated embodiment are hydraulic actuators, alternate embodiments can use other arm actuators, such as electric motors, or the like, to move the stabilizing arms to the selected positions.

When the arm actuator 34 is activated, the hydraulic cylinder 84 moves the actuator shaft 86 axially in a telescoping manner thereby pushing or pulling on the stabilizing arm's free end 35 and pivoting the stabilizing arm 32 about the pivot axle 78. Each hydraulic arm actuator 34 is adapted to lock its respective stabilizing arm 32 in a selected position, such as the extended, stabilizing position, during a dumping procedure.

During operation, each arm actuator 34 can be selectively controlled so as to control the positioning and orientation of the stabilizing arm 32 and the support plate 36 relative to the ground or other support surface. As an example, if the dump trailer 10 is on uneven ground, the arm actuators 34 can be individually adjusted to position each stabilizing arm 32 at different angular orientations relative to the mounting portion 30 when the support plates 36 engage the ground. In the illustrated embodiments, arm actuators 34 generate enough force so that the stabilizing arms 32 can raise the dump trailer's rear end off the ground. Accordingly, the outrigger assembly can also be used to level the dump trailer's rear end before a dumping operation by lifting one side of the dump trailer's rear end as needed.

Figure 7:
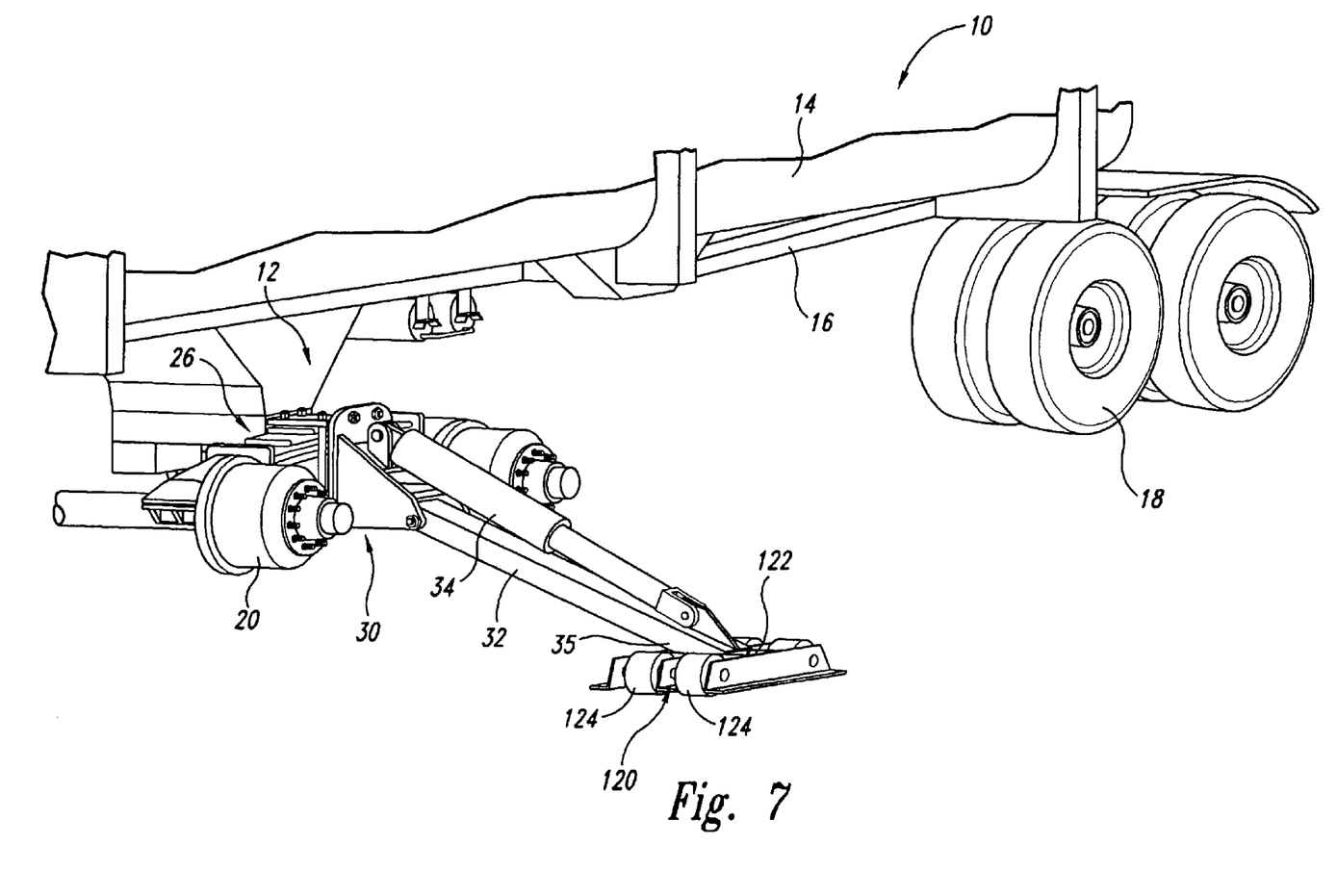
FIG. 7 is a partial isometric side view of an alternate embodiment of the present invention, with the outer end of the stabilizing arms shown attached to a stabilizing platform and rollers are mounted on the stabilizing platform.

An alternate embodiment of the present invention is shown in FIG. 7. This alternate embodiment is substantially similar to a previously described embodiment, the significant difference being at the free end 35 of each stabilizing arm 32. In this alternate embodiment, a support plate assembly 120 is attached to the stabilizing arm's free end 35. The support plate assembly 120 includes a generally flat support plate 122 and four support wheels 124. The support wheels 124 extend below the support plate 122 and are positioned to engage the ground or other support surface. The support wheels 124 are rotatably mounted to the support plate 122 so the wheels can roll when the stabilizing arms are in the extended, stabilizing position and the dump trailer moves during a dumping operation.

As an example, when a dump trailer 10 is utilized for dumping asphalt on a road bed, the stabilizing arms 32 are moved to the extended, stabilizing position wherein the support wheels 124 are in firm engagement with the road bed. Accordingly, the dump trailer 10 is fully stabilized and ready for the dumping procedure. As the asphalt is dumped out of the trailer bed 14, the dump trailer 10 is moved forward along the road bed to provide an even distribution of the asphalt onto the road bed for further processing. The wheels 124 help to prevent scraping or significantly scarring the road bed. Alternate embodiments can have other support plate configurations that move relative to the ground while maintaining sufficient stabilization of the dump trailer. As an example, the stabilizing plates can be skid plates shaped to slide over the ground without cutting into it during the dumping operation when the trailer is moved.

Figure 8:
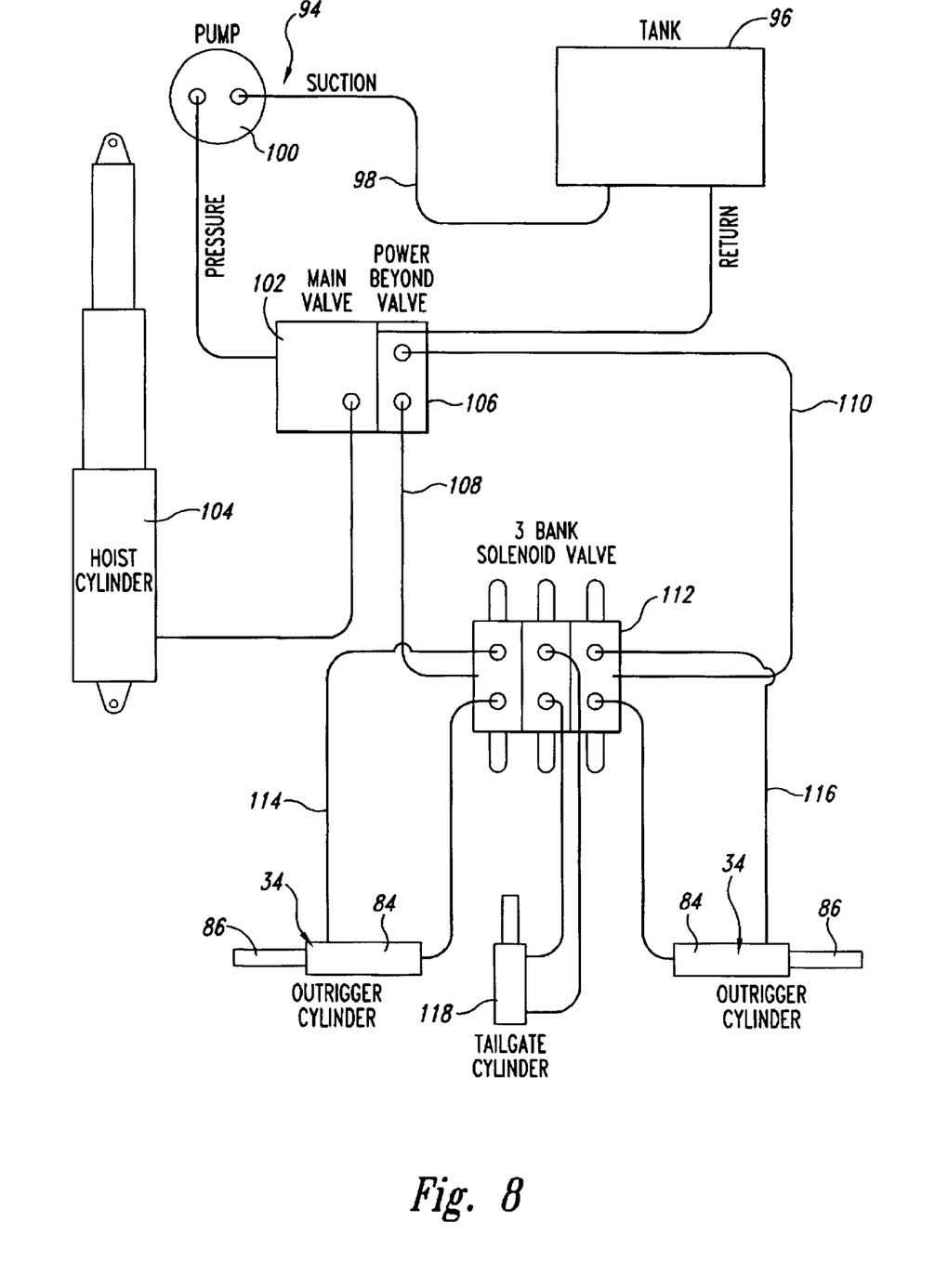
FIG. 8 is a schematic view of the hydraulic systems of the dump trailer and the outrigger assembly of FIG. 1.

FIG. 8 is a schematic view of a hydraulic system 94 mounted on the dump trailer configured to control the arm actuators 34 and stabilizing arms 32. The hydraulic system 94 includes a tank 96 of hydraulic fluid coupled via hydraulic line 98 to a pump 100. The pump 100 is connected to a main valve 102 that controls the flow of hydraulic fluid within the hydraulic lines 98 to create positive or negative pressure within the hydraulic system. The main valve 102 is coupled to the tank 96 via a pair of hydraulic lines that allow the hydraulic fluid to move to and from the tank.

In the illustrated embodiment, the hydraulic system 24 includes a power-beyond valve 106 coupled to the main valve 102 that provides for additional flow control of the hydraulic fluid past the main valve. The power-beyond valve 106 is connected to inlet and outlet hydraulic lines 108 and 110 that are coupled to a bank of three solenoid valves 112. One of the solenoid valves 112 is coupled to the left arm actuator 34 by a left outlet line 114, and a second solenoid valve is coupled to the right arm actuator by a right outlet line 116. Accordingly, two of the solenoid valves 112 control the left and right actuators 30, thereby controlling movement of the left and right stabilizing arms 32. The third solenoid valve 112 is connected to a hydraulic tailgate actuator 118 adapted to open or close the tailgate of the trailer bed 14. Alternate embodiments can include additional solenoid valves 112 if needed for control of additional features of the hydraulic system.

In one embodiment, the outrigger assembly 12 is retrofitted onto the dump trailer that has an existing hydraulic system. The outrigger assembly 12 includes an adaptor coupled to the power-beyond valve 106 and adapted to splice into the dump trailer's hydraulic system. Accordingly, the power-beyond valve 106, the solenoid valves 112, and the associated hydraulic lines are retrofitted onto the dump trailer's hydraulic system.

The solenoid valves 112 and the power-beyond valve 106 can be activated to cause the hydraulic fluid to flow into or out of the arm actuator's hydraulic cylinder 84, thereby moving the actuator shaft 86 axially and pivoting a respective stabilizing arm 32. The main valve 102, the power-beyond valve 106, and the solenoid valves 112 are coupled to switch mechanisms that control activation of the valves. The switch mechanisms are conveniently positioned to be easily activated by the operator of the dump trailer during a dumping procedure.

In the illustrated embodiment, the main valve 102 and the power-beyond valve 106 are coupled together provide to a safety mechanism that prevents the arm actuators 34 from being activated at the same time the hoist cylinder 104 is activated. Thus, the stabilizing arms 32 should be moved into place, such as in the extended, stabilizing position, before the trailer bed 14 can be raised and its contents dumped. The hydraulic system is configured so the actuator cylinders and the hoist cylinder can not be activated simultaneously. Other embodiments can utilize a selected safety feature that prevents the tailgate actuator 118 from being activated at the same time as the arm actuators 34.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to vehicle trailers, not necessarily the exemplary dump trailer generally described above.

These and other changes can be made to the invention in light of the above-detailed description. In general, in the following claims, the terms used should not be construed to limit the invention to the specific embodiments disclosed in the specification and the claims, but should be construed to include all trailers and outrigger assemblies that operate in accordance with the claims to provide the outrigger assembly and a method for use of the assembly. Accordingly, the invention is not limited by the disclosure, but instead its scope is to be determined entirely by the following claims.

We claim:

1. A stabilizing outrigger assembly and dump trailer, comprising:
   a dump trailer having a suspension system and a frame;
   a mounting portion attached to the dump trailer's suspension system independent of the frame;
   a stabilizing arm pivotally attached to the mounting portion; and
   a driving mechanism connected to the stabilizing arm and being moveable relative to the mounting portion to move the stabilizing arm between a stowed position and a deployed position with a distal portion of the stabilizing arm substantially adjacent to the ground, the driving mechanism being configured to releasably secure the stabilizing arm in the deployed position while the dump trailer is engaged in the dumping operation.

2. The outrigger assembly of clam 1, further comprising a second stabilizing arm pivotally attached to the mounting portion, and a second driving mechanism connected to the second stabilizing arm and being movable to pivot the second stabilizing arm relative to the mounting portion.

3. The outrigger assembly of claim 1 wherein the mounting portion is releasably attachable directly to the dump trailer's suspension system.

4. The outrigger assembly of claim 1 wherein the driving mechanism is a hydraulic apparatus.

5. The outrigger of claim 1 wherein the driving mechanism is inoperative while the dump trailer is engaged in a dumping operation.

6. The outrigger assembly of claim 1 wherein the mounting portion includes a bottom plate positionable below the suspension system, a top plate positionable above the suspension system, and securing member interconnecting the top and bottom plates with the suspension system sandwiched between the top and bottom plates.

7. The outrigger assembly of claim 6 wherein the mounting portion further includes a mounting flange coupled to at least one of the top and bottom plates and extending away from the suspension system, the stabilizing arm and the driving mechanism being pivotally attached to the mounting flange.

8. The outrigger assembly of claim 1 wherein the driving mechanism is a hydraulic actuator, and further comprising a hydraulic system connected to the hydraulic actuator and connectable to the dump trailer, the hydraulic system having a control valve that controls flow of hydraulic fluid to and from the hydraulic actuator to control movement of the stabilizing arm.

9. The outrigger assembly of claim 8 wherein the dump trailer has a hydraulic system, and the hydraulic system of the outrigger assembly is removably connectable to the hydraulic system of the dump trailer.

10. A stabilizing outrigger assembly for use with a dump trailer having a suspension system, comprising:
    a mounting portion attachable to the dump trailer's suspension system;
    a stabilizing arm pivotally attached to the mounting portion; and
    a driving mechanism connected to the stabilizing arm and being moveable relative to the mounting portion to move the stabilizing arm between a stowed position and a deployed position with a distal portion of the stabilizing arm substantially adjacent to the ground, the driving mechanism being configured to releasably secure the stabilizing arm in the deployed position while the dump trailer is engaged in the dumping operation;
    wherein the mounting portion is releasably attachable directly to the dump trailer's suspension system.

11. A stabilizing outrigger assembly for use with a dump trailer having a suspension system, comprising:
    a mounting portion attachable to the dump trailer's suspension system;
    a stabilizing arm pivotally attached to the mounting portion; and
    a driving mechanism connected to the stabilizing arm and being moveable relative to the mounting portion to move the stabilizing arm between a stowed position and a deployed position with a distal portion of the stabilizing arm substantially adjacent to the ground, the driving mechanism being configured to releasably secure the stabilizing arm in the deployed position while the dump trailer is engaged in the dumping operation;
    wherein the mounting portion includes a bottom plate positionable below the suspension system, a top plate positionable above the suspension system, and securing member interconnecting the top and bottom plates with the suspension system sandwiched between the top and bottom plates.

12. The outrigger assembly of claim 11 wherein the mounting portion further includes a mounting flange coupled to at least one of the top and bottom plates and extending away from the suspension system, the stabilizing arm and the driving mechanism being pivotally attached to the mounting flange.

* * * * *